(12) United States Patent
Giles

(10) Patent No.: US 9,136,684 B2
(45) Date of Patent: Sep. 15, 2015

(54) VEHICLE BLOCK HEATER CORD WINDER

(71) Applicant: Vincent Leon Giles, Newmarket (CA)

(72) Inventor: Vincent Leon Giles, Newmarket (CA)

( * ) Notice: Subject to any disclaimer, the term of this patent is extended or adjusted under 35 U.S.C. 154(b) by 187 days.

(21) Appl. No.: 13/828,137

(22) Filed: Mar. 14, 2013

(65) Prior Publication Data

US 2014/0262665 A1    Sep. 18, 2014

(51) Int. Cl.
*H02G 11/02*  (2006.01)
*B60L 11/18*  (2006.01)
*B60R 13/10*  (2006.01)
*B65H 75/42*  (2006.01)
*B60L 11/12*  (2006.01)
*B60L 11/14*  (2006.01)

(52) U.S. Cl.
CPC .............. *H02G 11/02* (2013.01); *B60L 11/123* (2013.01); *B60L 11/14* (2013.01); *B60L 11/1818* (2013.01); *B60R 13/105* (2013.01); *B65H 75/425* (2013.01); *B60L 2230/12* (2013.01); *B60L 2240/445* (2013.01); *B65H 2701/34* (2013.01); *Y02T 10/6217* (2013.01); *Y02T 10/7005* (2013.01); *Y02T 10/7077* (2013.01); *Y02T 10/7088* (2013.01); *Y02T 90/121* (2013.01); *Y02T 90/14* (2013.01)

(58) Field of Classification Search
CPC ....................................................... H02G 11/02
USPC ............................................ 191/12.2 R, 12.4
See application file for complete search history.

(56) References Cited

U.S. PATENT DOCUMENTS

| | | | |
|---|---|---|---|
| 3,853,285 A | 12/1974 | Woodring | |
| 3,999,640 A | 12/1976 | Persson | |
| 4,426,045 A * | 1/1984 | Gifford | 242/232 |
| 4,940,859 A * | 7/1990 | Peterson | 191/12.4 |
| 5,445,252 A * | 8/1995 | McKee et al. | 191/12 R |
| 5,669,471 A * | 9/1997 | Unze | 191/12.2 R |
| 5,803,216 A * | 9/1998 | McNaught | 191/12.4 |
| 6,264,016 B1 * | 7/2001 | Bales | 191/12.4 |
| D461,451 S | 8/2002 | Hawley | |
| 6,702,077 B2 * | 3/2004 | Skowronski | 191/12.2 R |
| 6,854,575 B1 * | 2/2005 | Desormeaux et al. | 191/12.4 |
| 2003/0038203 A1 | 2/2003 | Ohama | |
| 2004/0084271 A1 * | 5/2004 | Woodruff | 191/12.2 R |
| 2005/0161548 A1 | 7/2005 | Naneff et al. | |
| 2009/0090589 A1 | 4/2009 | Matthew et al. | |
| 2010/0300826 A1 * | 12/2010 | Peterson et al. | 191/12.2 R |

* cited by examiner

*Primary Examiner* — Zachary Kuhfuss
(74) *Attorney, Agent, or Firm* — Sand & Sebolt

(57) ABSTRACT

A license plate electrical cord winding apparatus with a housing, an inner cavity, a generally cylindrical spindle affixed to said housing within said inner cavity, a reel assembly mounted to the housing within the inner cavity circumferentially about the spindle. There is also an urging member connected to the reel assembly, and an extension cord, wound around the reel assembly. A guiding roller mounted within the inner cavity guides the cord as it winds or unwinds about the reel assembly.

18 Claims, 9 Drawing Sheets

VEHICLE BLOCK HEATER CORD WINDER

BACKGROUND OF THE INVENTION

1. Technical Field

The present invention relates generally to an improved cord winding device mountable to the front bumper of a car. More specifically, the invention relates to a vehicle block heater power cord winder that winds and unwinds an extension cord.

2. Background Information

In parts of Canada and the northern United States, the temperatures during the winter are so low that most vehicles have engine blocks with block heaters. Aftermarket block heaters have a relatively short 120 volt alternating current male plug that hangs or is tied just outside of the front grill of the vehicle. There is usually an accompanying 120 volt A/C extension cord kept in the trunk or the rear seat of the vehicle. When it is very cold or the vehicle is parked outside overnight in the cold, a driver will plug in an extension cord to the block heater and then to an outside 120 volt outlet, usually provided by a home or business. In northern cities, there are 120 volt alternating current outlets at every parking lot location, even rental cars come with block heaters and extension cords. However, keeping a loose extension cord in the backseat of one's car or in the trunk is problematic.

It is common for conventional, electric, or hybrid cars or trucks to be adapted with various components which require a 120 volt A/C power supply for operation. Such components may include engine block heaters, interior heaters, battery chargers, air compressors, and the like. Often times, these components require a grounded 3-wire 16 gauge extension cord to function properly. The cord must be removed from the vehicle's path prior to departing.

There have been other attempts in prior art to provide a way for reeling an extension cord behind a license plate. An example of prior art may be had when referring to U.S. Pat. No. 6,264,016, issued to Bales on Jul. 24, 2001, which depicts a mobile power center with a self-retracting cord having a spring-loaded winding spindle with a large housing. Further, Bales provides a 12 volt direct current to a 120 volt alternating current inverter.

Another example may be had when referring to U.S. Patent Application Publication No. US 2005/0161548 in the name of Naneff et al. published on Jul. 28, 2005. Naneff discloses an improved cord winding device mounted to a front license plate bracket capable of accommodating electrical devices which require a 120 volt power supply for a vehicle. It further provides a water-resistant multi-compartment housing mounted on a bumper with a vehicle's license plate, a pair of electrical cords adapted for connection between a winder and a vehicle, as well as a rotatable first cord storage reel mounted in a central housing compartment for rotation about an axis in the direction of travel of the vehicle.

However the prior art fails to fully satisfy the needs of drivers in cold weather. Thus, there exists a need for an improved way to wind and unwind an electrical extension cord in a license plate housing.

BRIEF SUMMARY OF THE INVENTION

The following summary is intended to introduce the reader to this specification but not to define any invention. One or more inventions may reside in a combination or sub-combination of apparatus elements or process steps described in this summary or in other parts of this document, for example the detailed description or the claims.

It is thus a brief summary of the preferred embodiment to provide vehicle owners with an improved electrical cord winding device mounted to the bumper of a car. Further, the present improved cord winder ensures that the power cord will properly unwind and rewind itself via the guiding roller.

The preferred embodiment of an apparatus includes a license plate electrical cord winding apparatus with a housing, where the housing defines an inner cavity and is adapted to be mounted on a bumper of a vehicle, a reel assembly mounted to the housing within the inner cavity, wherein the assembly is capable of being wound and unwound, an extension cord, wherein the extension cord is disposed circumferentially about said reel assembly, and a guiding roller mounted within the inner cavity proximate to the reel assembly, wherein the guiding roller guides the cord as it winds or unwinds about the reel assembly

BRIEF DESCRIPTION OF THE SEVERAL VIEWS OF THE DRAWINGS

Preferred embodiments of the invention, illustrative of the best mode in which Applicant contemplates applying the principles, are set forth in the following description and are shown in the drawings and are particularly and distinctly pointed out and set forth in the appended claims.

Similar numbers refer to similar parts throughout the drawings.

DETAILED DESCRIPTION

Figure 1:
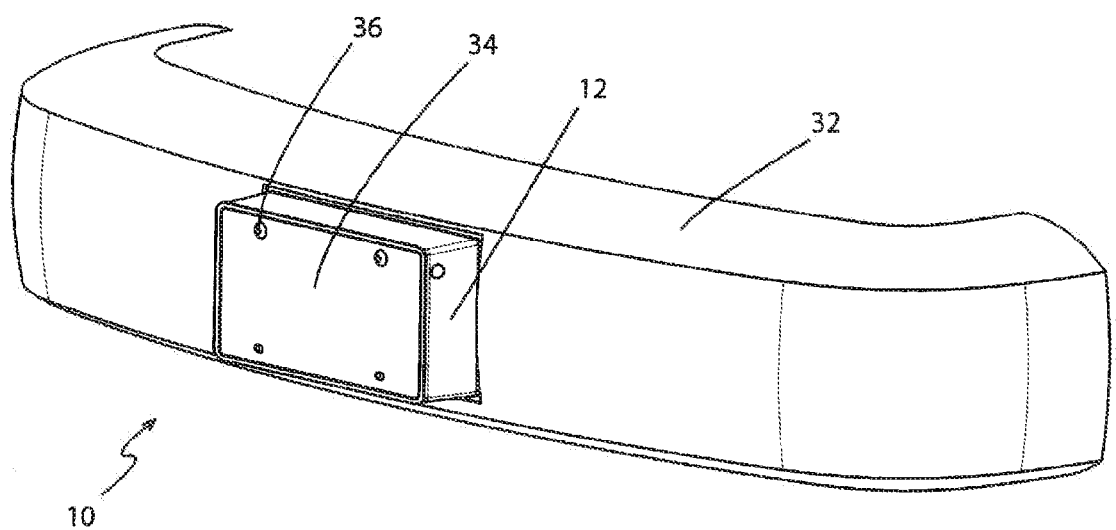
FIG. 1 is a perspective view of the assembled system behind the license plate on the front bumper of a vehicle, showing an indicator light visible on the left side of the system near its top.
Figure 2:
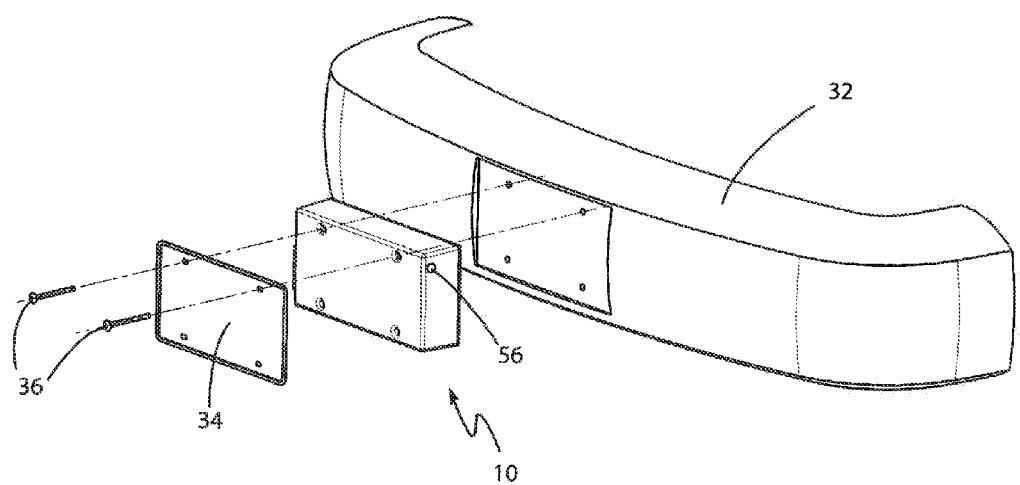
FIG. 2 depicts an exploded perspective view of the cord system, bumper, license plate, and attachment bolts.
Figure 3:
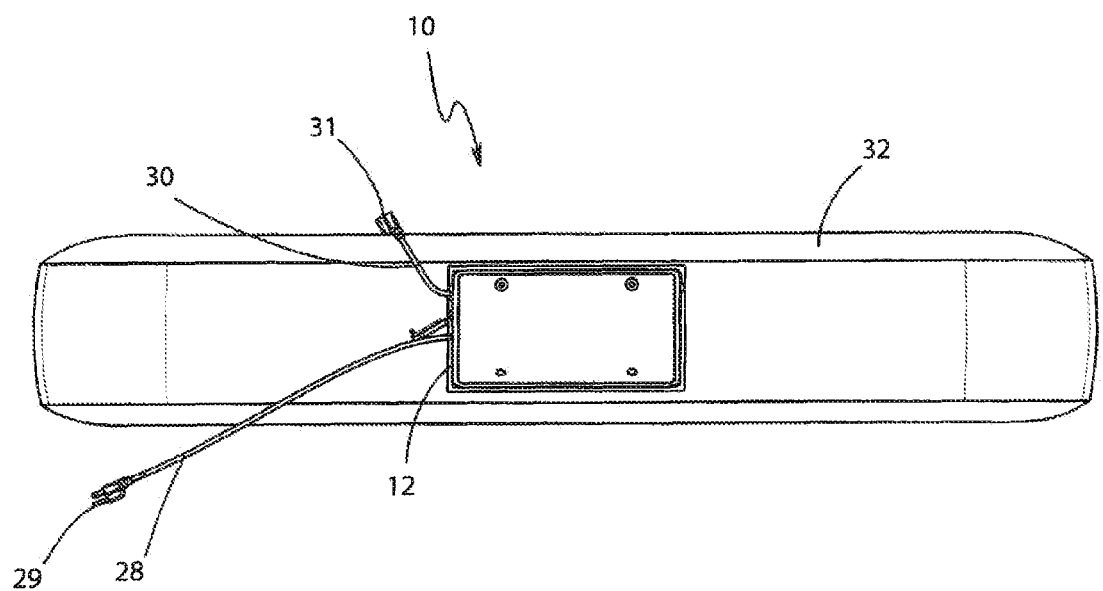
FIG. 3 depicts a front elevation view of a bumper with a male plug cord partially unreeled and a short fixed female plug that connects to a block heater plug.

Generally referring to FIGS. 1-9 a license plate cord winder 10 has a housing 12, a reel assembly 24 mounted within the housing 12. Reel assembly 24 has an extension cord 18 circumferentially wound about it. Reel assembly 24 winds or unwinds an extension cord 18 as extension cord 18 is extracted or retracted into housing 12. During extraction and retraction, extension cord 18 is guided generally by a guiding roller 22 located proximate to reel assembly 24.

The license plate cord winder 10 is preferably provided in combination with a conventional alternating current (A/C) automobile engine block heater. The winder 10 is capable of being electrically connected to the block heater to provide its necessary electrical power.

Referring now to FIGS. 1-5, the license plate cord winder 10 is shown mounted to the front bumper 32 of an automobile.

The license plate cord winder 10 has a housing 12 which is disposed adjacent a bumper 32. The housing 12 is preferably mounted to the bumper 32 via mounting bolts 36 capable of passing through a series of mounting bolt apertures 16 defined by the housing 12. Further, a license plate 34 can be mounted to the front of the housing 12. A power ON/OFF indicator light 56 may be provided. Preferably indicator light 56 is a light emitting diode (LED) type.

Male extension cord end 28 is one end of extension cord 18. A fixed female extension cord end 30 extends outward from the housing 12. A door hatch 20 is shown in an open position to permit the extraction of the male end of the extension cord 28 so it may be plugged into a conventional 120 volt A/C power source. Preferably, door hatch 20 is rubber.

Preferably extension cord 18 is a sixteen gauge wire. The term gauge is to be interpreted throughout this specification and claims as having its ordinary meaning in the field of electrical wiring measurements. Namely, the gauge measures the diameter of round, solid, nonferrous, electrically conductive wire. Ordinarily, a sixteen gauge wire has a diameter of 0.508 in. or 1.291 mm. Further, the ordinary resistance of sixteen gauge wire is 4.016 mΩ/ft or 13.17 mΩ/m.

Extension cord 18 permits a maximum amount of amperes depending on the overall length extension cord 18. The sixteen gauge three wire extension cord 18 has a maximum amperes (amps) of 13 amps when the length of extension cord is fifty feet or less. The sixteen gauge three wire extension cord 18 has a maximum amperes of ten amps when the length of extension cord is greater than fifty feet but less than one hundred feet. Preferably, extension cord 18 is about twenty feet long. As such, extension cord 18 should have a maximum capacity of thirteen amps.

Figure 4:
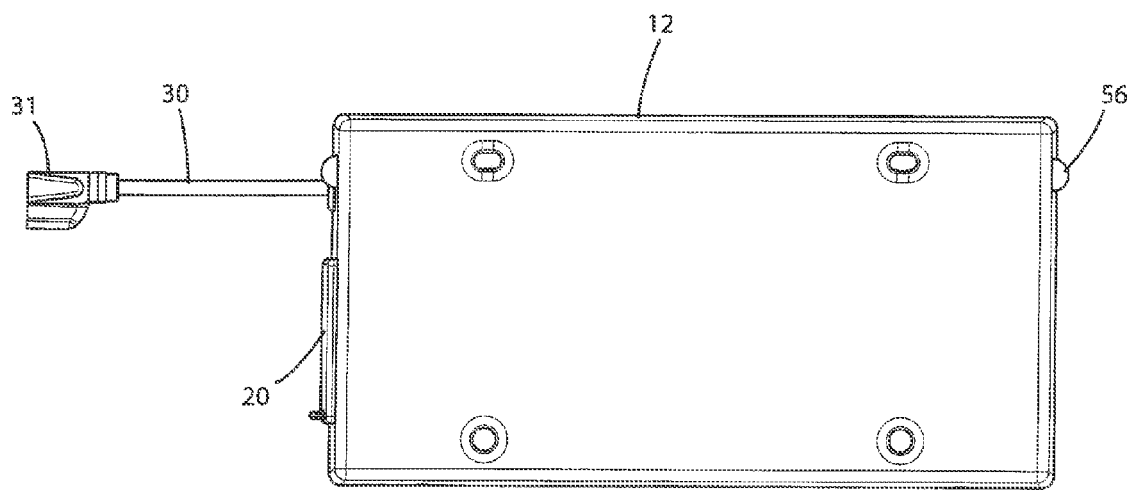
FIG. 4 shows a front elevation view of the cord system with the rubber hatch door closed and extension cord fully wound.
Figure 5:
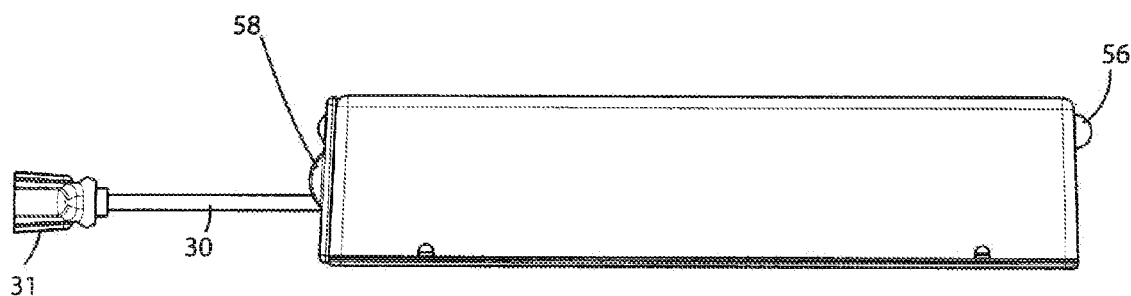
FIG. 5 shows a bottom plan view of the cord system shown in FIG. 4.

Turning now to FIGS. 4-5, hatch door 20 is generally flush with the sidewall of the housing 12. The hatch door 20 has a gripping member 58 to allow a user to grip and open the hatch door pivotally about a transverse hatch door channel 42. Hatch door 20 is generally ratably connected so a user may manipulate the hatch door 20 between an open and closed position as desired by the user. Further, the hatch door 20 gripping member 58 can be seen in this embodiment as an outwardly extending handle.

For illustrative purposes, the embodiment is shown with the housing plate 52 removed so the inner components may be described fully. The housing 12 defines an inner cavity 50.

Figure 6:
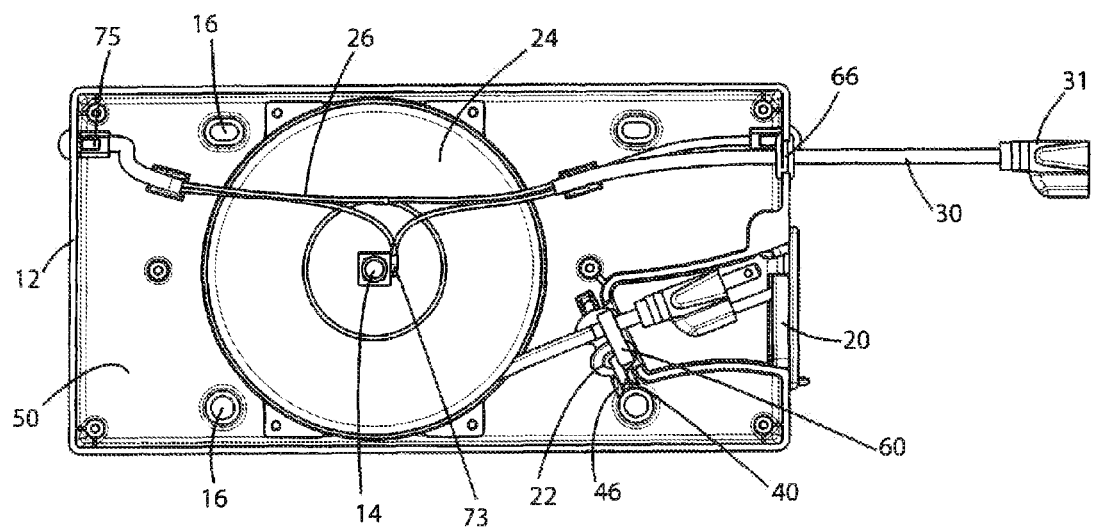
FIG. 6 shows a rear elevation view of the cord system with the housing plate removed.
Figure 7:
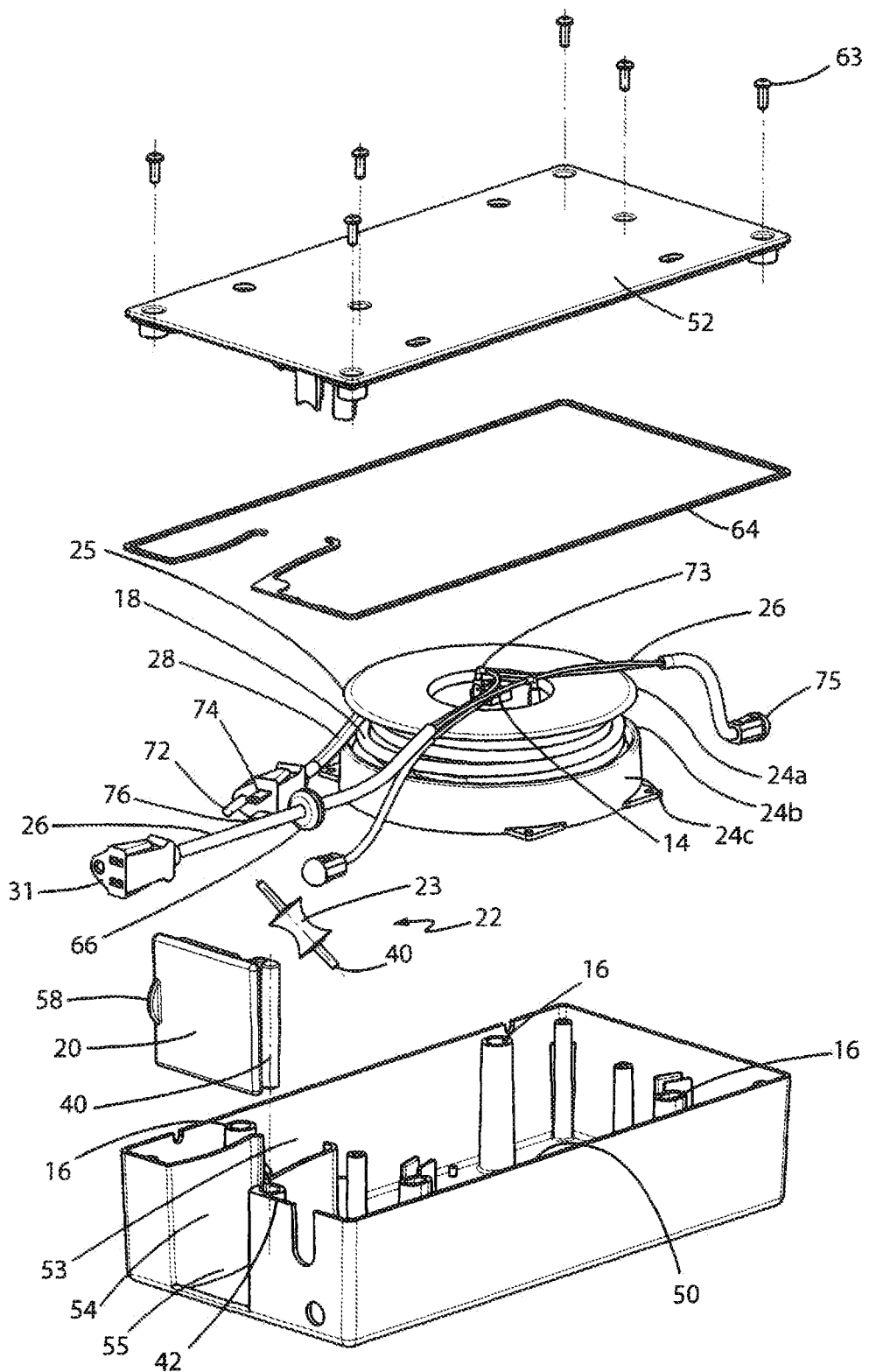
FIG. 7 depicts an exploded perspective view of the cord system.

Referring now to FIGS. 6-7, housing 12 has two opposing parallel planar members orthogonally adjacent to two other opposing parallel planar members. These members define the vertical sidewalls of the housing. The planar members are perpendicularly adjacent a planar member forming a housing backing.

Housing 12 is preferably made from materials such as polymer, polycarbonates, and the like. However, it is contemplated that other conventionally acceptable materials such as various metals or substantially metal composites would suffice. The housing 12 is preferably an integrally molded unibody material providing a plurality of brackets and mounting members to which components of the present invention may be attached.

An inner cavity 50 is defined by housing 12. A reel assembly 24 is preferably disposed about a spindle 14 within the cavity 50. Reel assembly 24 is generally spool-like in shape. The spool-like shape generally provides round cylindrical regions 24a, 24b, 24c where two outer regions 24a, 24c, having the same diameter form two flanges and the inner region 24b having a diameter smaller than the outer region forms a hub. Reel assembly 24 defines an inner annular recess 25. This generally provides the shape of a spool, allowing the extension cord 18 to be wound about the inner segment 24b and retained by the outer segments 24a, 24c within the inner annular recess 25. Reel assembly 24 is preferably a nonconductive plastic, polymer, polycarbonate or other similar nonconductive material.

Extension cord 18 is a length of flexible electrical power cable preferably with a conventional male plug 29 attached to male cord end 28 and a terminal end connecting to the reel assembly 24. The reel assembly 24 connects to an electrical raceway 26 which operatively connects to a female cord end 30 having a socket 31. The female extension cord end 30 is a fixed length for connecting to an accessory such as a vehicle block heater.

Raceway 26 is preferably connected adjacent the center of the reel assembly 24. The electrical raceway has a positive terminal 73 and a negative terminal 75. Positive terminal 73 is operatively connected to positive wire 74. Negative terminal 75 is operatively connected to a negative wire 76. The terminal connected to the spindle 14 is connected in a manner to allow circumferential rotation about the longitudinal axis of the spindle 14. Further, the electrical raceway 26 defines the inner terminal end of the fixed female extension cord end 30.

A guiding roller 22 is positioned adjacent the reel assembly 24. Guiding roller 22 generally guides or directs extension cord 18 as the male end 28 is extracted by a user. Similarly, guiding roller 22 guides or directs extension cord 18 as it is retracted or wound about reel assembly 24 when user has finished using the winder 10. The guiding roller 22 is preferably made of a material that engages the conventional outer coating of the extension cord 18. This engagement allows the roller 22 to guide the extension cord as it rotates while simultaneously substantially preventing the extension cord 18 from slipping atop the roller 22 surface. The guiding roller 22 comprises a roller housing 23. The roller housing 23 is shaped in a generally cylindrical manner being inwardly bowed. The roller 22 has two ends, which are opposite each other and orthogonally intersect the roller's 22 longitudinal axis. The roller further has a longitudinal center, which is located equidistant between the two ends.

The diameters of the roller 22 at each of its ends are equal. The preferable end diameter is one inch. The diameter at the longitudinal center is smaller than the end diameter. It is preferable that the longitudinal center will have a diameter of 0.75 inches. This continuous smooth surface of the roller housing 23 creates the inwardly bowed appearance of the roller 22.

The guiding roller 22 is preferably hollow and capable of receiving an axle 44. The guiding roller 22 rotates about an axle 44. Preferably, axle 44 has a diameter of approximately 0.25 inches. Axle 44 is substantially fixed in its longitudinally transverse directions allowing guiding roller 22 to rotate about its longitudinal axis. The axle 44 is adapted to fit into the housing 12 in an area known as the axle receiving aperture 46. The axle 44 fits within at least one axle receiving aperture 46 by an interference fit. This permits the axle 44 to rotate without moving in a transverse or lateral direction. Although this manner of permitting rotation is contemplated, other known ways of permitting rotation are permissible such as using bearings.

The guiding roller 22 is shown oriented in its installed position of a 45 degree angle α. The 45 degree angle α is preferable for guiding the male cord end 28 when it is being extracted and retracted to wind or unwind about the reel assembly 24. Although the 45 degree angle α is preferred, other angles which assist the guiding roller 22 for extracting and retracting the cord 18 are contemplated.

Located adjacent to the guiding roller 22 and proximate to reel assembly 24 is a cord stop 60. The cord stop 60 prevents the male end of the extension cord 28 from retracting and unwinding too far from the reel assembly 24.

When the extension cord is fully retracted about the reel assembly 24, the male end of the extension cord 18 is retained within a recessed area 54 defined by the housing sidewall. The housing sidewall recess 54 is formed by the housing 12 and defines an access area or cavity into which the male end of the extension cord 28 is shielded from outside elements such as wind, dust, rain, snow, ice, etc. Housing sidewall recess 54 has three walls 54*a*, 54*b*, and 54*c*. Two walls 54*a*, 54*c* are spaced apart from each other and intersect a third wall 54*b*. Housing sidewall recess 54 extends inward from the sidewall towards a proximal end at the third wall 54*b*. The proximal end of the housing sidewall recess has an access opening 53 through which the extension cord passes and said opening being adjacent to the guiding roller 22 and cord stop 60. The proximal opening 53 is in operative communication with cavity 50 and housing recess 54. Opening 53 permits access between cavity 50 and housing recess 54. The distal end of the housing sidewall recess 54 defines an opening 55 which may be covered by the hatch door 20. Distal opening 55 permits access between the outside elements and housing recess 54 when hatch door 20 is in its open position.

The hatch door 20 is generally flush with the vertical sidewall of the housing 12 when closed. At the end of the hatch door 20 opposite the gripping member 20 is a hatch door pin 40. Hatch door pin 40 acts as a pivot to allow the hatch door to pivotally open about said hatch pin 40. The hatch door pin 40 integrally slides into the hatch door channel 42, said hatch door channel 42 being formed by the molded housing 12. Preferably, the hatch door 20 will be made of rubber but other conventionally known and acceptable materials will suffice.

A license plate 34 may be secured to the housing 12 via a plurality of mounting bolts 36. The mounting bolts 36 are inserted through a plurality of mounting bolt apertures 16. Mounting bolts are received by the housing by a plurality of aligned receiving areas. The mounting bolts 36 are preferably conventionally sized license plate bolts, however other bolts are contemplated. A gasket 64 is sandwiched or juxtaposed between the housing plate 52 and the housing 12 to provide a sealed closure. Gasket 64 is contemplated as being made from any conventionally acceptable seal, such as rubber.

Housing plate 62 connects to housing 12 via a plurality of housing securing members 63. Housing securing members 63 are received by a plurality of receiving areas defined by housing 12.

The female cord end 30 further has a retention member 66 circumferentially affixed to the cord 18. The circumferential retention member 66 secures the female cord end 30 to the housing 12. Further, the circumferential retention member 66 prevents the female end from extracting from the housing 12 or causing damage to the electrical raceway 26. Preferably retention member 66 is made of rubber, yet other suitable materials for securing the cord 18 to the housing 12 are contemplated.

A hatch pin 40 is shown as being vertically and slidably engaged with the hatch door channel 42. The hatch pin 40 slides into the hatch door channel 42 allowing the hatch door 20 to be mounted substantially flush with the housing 12 yet pivotally open to permit access to the housing sidewall recess where the male cord end 28 is retained. Hatch door 20 rotates between open and closed positions when urged by a user.

Preferably extension cord 18 incorporates a grounded wire or terminal 72 in a conventional manner. Extension cord 18 comprises a positive wire 74, negative wire 76, and a ground wire 72. The terms positive wire, negative wire, and ground wire are to be interpreted throughout this specification and claims as having their ordinary meaning in the field of electrical wiring.

Figure 8:
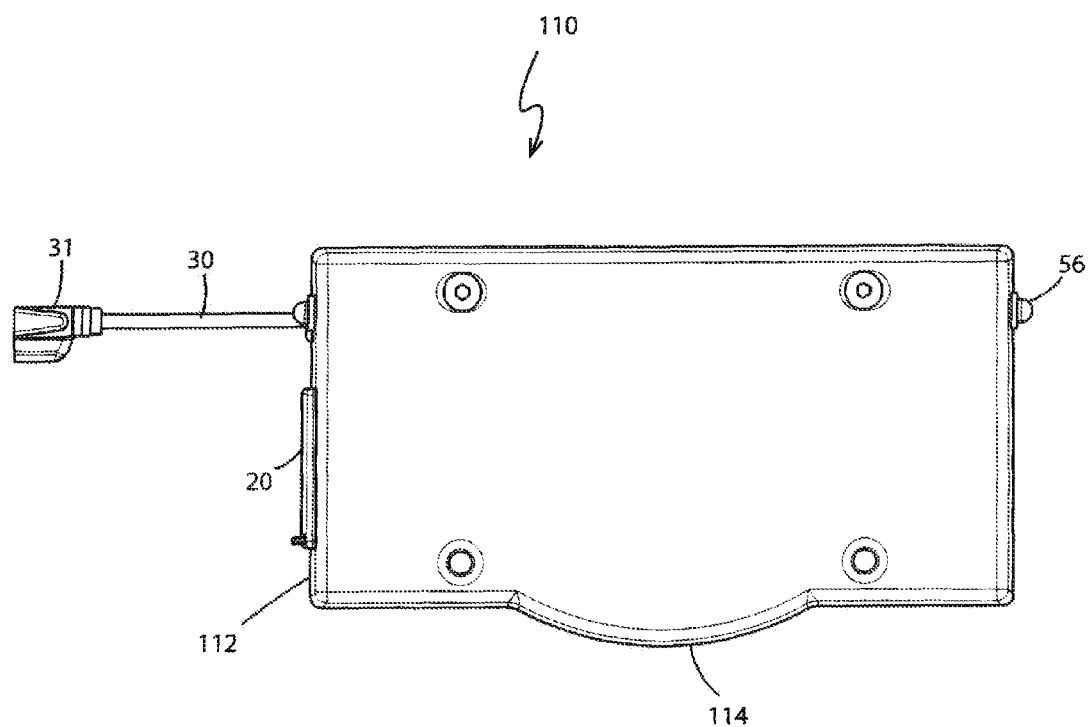
FIG. 8 shows a front elevation view of an alternate embodiment of the cord system.
Figure 9:
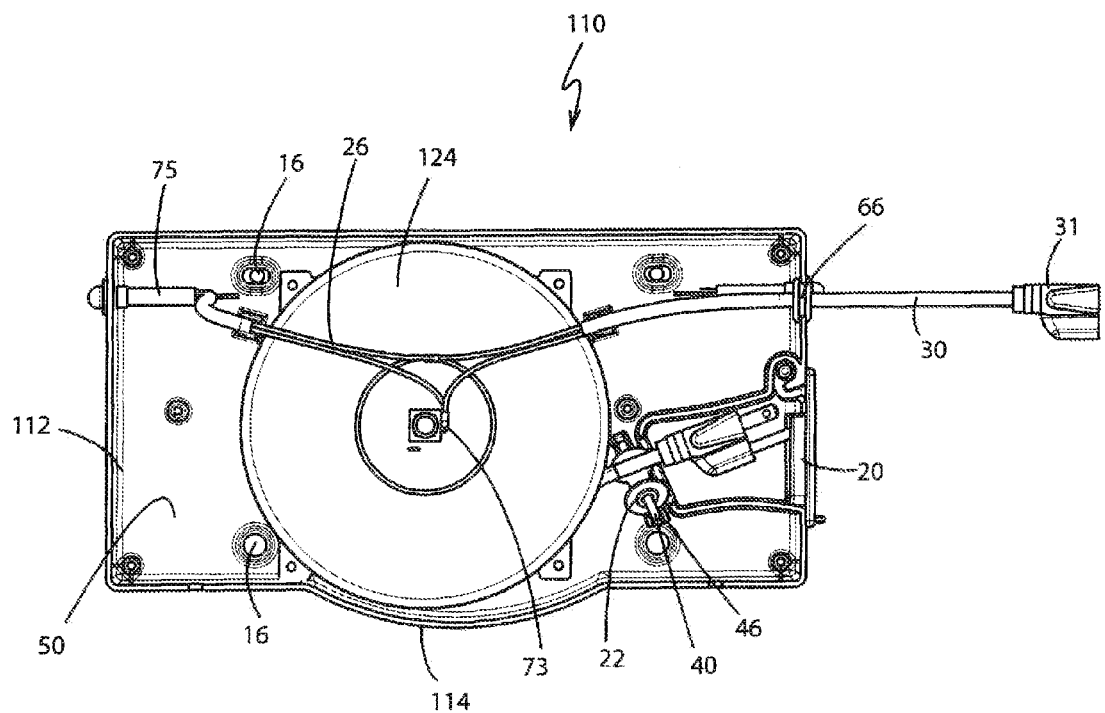
FIG. 9 depicts a front elevation view of an alternate embodiment of the cord system with the housing plate removed.

FIGS. 8-9 provide an alternative embodiment of the license plate cord winder 110. License plate cord winder 110 is similar to license plate cord winder 10 and only the differences will be discussed hereinbelow. A housing 112 has a partially semi-circular bulging lower convex sidewall 114. Sidewall 114 bows downwardly arcuate for a lateral distance. The shape of the alternative embodiment cord winder 110 permits a three wire sixteen gauge extension electrical cord having a length of about twenty feet to be stored inside the housing 112.

Reel assembly 124 has a larger diameter than the reel assembly 24 disclosed in the first embodiment. The larger diameter permits the reel assembly 124 to substantially wind and unwind a larger extension cord. Other than sidewall 114 and the reel assembly 124, cord winder 110 has substantially similar components and operates in a similar manner as the embodiment described in FIGS. 1-7.

In operation, a user first mounts the winder 10 to his automobile bumper 32 via the mounting bolts 36. A user may then attach a license plate 34 to the outer surface of the housing 12.

When an accessory, such as an automotive engine block heater, must be electrically powered to operate and the block heater is unable to reach the power source through its own power cord, a user may use the embodiment to bridge the gap between the power source and the block heater.

The male end 28 of the extension cord 18 must be extracted from the winder 10. To extract the extension cord 18, a user opens the door hatch 20 and exposes the male end 28 that is retained in the housing recess 54. The user may grasp the male plug 29. Holding the male plug 29, a user pulls the cord 18 out from the housing 12. As the user pulls the cord 18 from the housing 24, the cord 18 is unwinding from the reel assembly 24. The length of the cord 18 extracted allows the winder 10 to physically connect with a power source.

Male end 28 is connected to a power source. The power cord from the block heater is connected to the fixed female end 30.

Extension cord 18 electrically powers the block heater by providing the electrical connection to the power source. When the block heater has completed its task of heating the engine block, the power source is then turned off.

User disconnects the male end from the power source and disconnects the female end from the accessory. The user then carefully stores any power cord from either the power source or accessory. Then, the user will wind the male end 28 of the extension cord 18 about the reel assembly 24 within the housing 12. Alternative embodiments are contemplated as would be known to one in the art. Namely, an urging member may be operatively connected to reel the assembly 24.

Other alternative embodiments contemplated include the circular reel assembly 24 being rotationally urged by urging member through conventionally known methods, but way of example and not a limitation, springs or ratcheting ways. Further, other embodiments may not contain a spindle. Other contemplated embodiments may have a continuous extension cord and eliminate the electrical raceway. Different embodiments may provide alternative manners of mounting the housing to the bumper.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A license plate electrical cord winding apparatus comprising:
   a housing, said housing defining an inner cavity and said housing adapted to be mounted on a bumper of a vehicle;
   a reel assembly carried by said housing within said inner cavity, said reel assembly capable of being wound and unwound;
   an extension cord, wherein said extension cord is disposed circumferentially around said reel assembly; and
   a guiding roller mounted within said inner cavity proximate to said reel assembly, wherein said guiding roller guides the cord as the cord as it winds or unwinds around said reel assembly, and the guide roller is at an angle of forty five degrees relative to horizontal.

2. The apparatus of claim 1, wherein said housing further comprises:
   a housing wall recess defined by said housing, wherein said recess has a proximal end and a distal end, and the guiding roller is adjacent the proximal end.

3. The apparatus of claim 2, wherein said housing wall recess further comprises:
   the proximal end defining an aperture in operative communication with said inner cavity; and
   the distal end defining an opening.

4. The apparatus of claim 3, further comprising:
   a hatch door rotatably pivotable between an open and closed position configured to cover the opening defined by the distal end of the housing wall recess.

5. The apparatus of claim 1, wherein said reel assembly further comprises:
   an electrical raceway electrically connected to said reel assembly, wherein a positive wire is electrically connected to a positive terminal and a negative wire is electrically connected to a negative terminal, and at least either the positive or negative terminal is connected to a spindle permitting circumferential rotation about a longitudinal axis of said spindle.

6. The apparatus of claim 1, wherein said guiding roller further comprises:
   a generally cylindrical roller housing having two ends, wherein said roller housing is inwardly bowed near a longitudinal center, further said roller housing having a continuous smooth surface.

7. The apparatus of claim 6, wherein said guiding roller housing is rubber and adapted to grippingly contact an outer surface of the extension cord.

8. The apparatus of claim 6, wherein said guiding roller housing is hollow.

9. The apparatus of claim 1, wherein said guiding roller substantially secures said extension cord to a roller housing as said extension cord is guided by said guiding roller as said roller rotates.

10. The apparatus of claim 1, wherein said guiding roller further comprises:
    an axle generally fixed in a longitudinally transverse direction permitting said roller to rotate about a longitudinal axis;
    axle receiving apertures defined by said housing, wherein said axle fits within said apertures.

11. The apparatus of claim 1, further comprising:
    a cord stop disposed around the extension cord, wherein the cord stop is engageable with said housing, wherein said cord stop prevents said extension cord from retracting and unwinding too far from said reel assembly.

12. The apparatus of claim 1, further comprising:
    a housing plate defining a plurality of apertures capable of receiving a mounting member
    a gasket juxtaposed between said housing and said housing plate to form a seal.

13. A license plate electrical cord winding apparatus comprising:
    a housing, the housing defining an inner cavity and the housing adapted to be mounted on a bumper of a vehicle;
    an electric cord reel assembly carried by the housing within the inner cavity;
    a semicircular lower sidewall on the housing bowing downwardly;
    a first flat wall on the housing facing downwardly and disposed left of the semi-circular lower sidewall when viewed from a front view;
    a second flat wall on the housing facing downwardly and disposed right of the semi-circular lower sidewall when viewed from the front view;
    a housing wall recess defined by said housing, wherein said recess has a proximal end and a distal end; and
    a guiding roller adjacent the proximal end mounted to the housing at a 45° angle relative to horizontal.

14. The apparatus of claim 13, wherein the reel assembly further comprises
    two outer flanges, having the same diameter disposed on each side of a hub having a diameter smaller than the flanges and defining an inner annular recess, wherein the two outer flanges occupy a portion of the inner cavity defined by the semicircular bulging lower sidewall on the housing.

15. The apparatus of claim 13, further comprising:
    a three-wire sixteen gauge electric cord wound about the reel assembly and partially occupying a portion of the inner cavity defined by the semicircular bulging lower sidewall on the housing.

16. The apparatus of claim 13, wherein the housing further comprises:
    a plug receiving recess defined by the housing, wherein the recess has a proximal end and a distal end, and the recess entirely above either one of the first flat wall and the second flat wall.

17. A method of using a cord winding apparatus comprising the steps of:
    mounting an extension cord winding apparatus having a reel assembly to an automobile bumper;
    extracting a first end of an extension cord from the winder;
    passing the extension cord over a guide roller mounted at a 45° angle relative to horizontal;
    connecting the first end of the extension cord to a power source;
    connecting a second end of the extension cord to an accessory;
    powering the accessory until the accessory has completed a task;
    disconnecting the ends; and
    storing the extension cord by winding the cord about the reel assembly.

18. The method of claim 17, wherein the step of extracting the extension cord further comprises:
    opening a door hatch;
    exposing the first end retained in a housing recess;
    grasping a plug on the first end;

pulling the cord out from the housing causing the cord to unwind from the reel assembly.

* * * * *

UNITED STATES PATENT AND TRADEMARK OFFICE
CERTIFICATE OF CORRECTION

PATENT NO.            : 9,136,684 B2                                   Page 1 of 1
APPLICATION NO.       : 13/828137
DATED                 : September 15, 2015
INVENTOR(S)           : Giles It is certified that error appears in the above-identified patent and that said Letters Patent is hereby corrected as shown below:

Claims
Column 7, line 17 (Claim 1) change "as the cord as it winds" to --as the cord winds--.

Signed and Sealed this
Second Day of February, 2016

Michelle K. Lee
*Director of the United States Patent and Trademark Office*